US012646413B2

(12) United States Patent
Robertson et al.

(10) Patent No.: US 12,646,413 B2
(45) Date of Patent: Jun. 2, 2026

(54) IMPACT DETECTION SYSTEM

(71) Applicant: FCA US LLC, Auburn Hills, MI (US)

(72) Inventors: James A Robertson, White Lake, MI (US); Xavier A Robertson, White Lake, MI (US); Daniel Pereira, LaSalle (CA)

(73) Assignee: FCA US LLC, Auburn Hills, MI (US)

( * ) Notice: Subject to any disclaimer, the term of this patent is extended or adjusted under 35 U.S.C. 154(b) by 107 days.

(21) Appl. No.: 18/624,438

(22) Filed: Apr. 2, 2024

(65) Prior Publication Data

US 2025/0308387 A1 Oct. 2, 2025

(51) Int. Cl.
*G08G 1/16* (2006.01)

(52) U.S. Cl.
CPC ............ *G08G 1/162* (2013.01); *G08G 1/166* (2013.01)

(58) Field of Classification Search
CPC ............................... G08G 1/162; G08G 1/166
See application file for complete search history.

(56) References Cited

U.S. PATENT DOCUMENTS

| | | | | |
|---|---|---|---|---|
| 2003/0016143 | A1* | 1/2003 | Ghazarian | G08G 1/0962 340/901 |
| 2016/0163217 | A1* | 6/2016 | Harkness | G09B 7/00 434/65 |
| 2020/0070817 | A1* | 3/2020 | Vyas | B60W 40/09 |
| 2022/0122460 | A1* | 4/2022 | Takaki | B60Q 1/535 |
| 2023/0008744 | A1* | 1/2023 | Kozono | G06V 20/58 |
| 2023/0215273 | A1* | 7/2023 | Yamauchi | G06V 20/64 |
| 2025/0244741 | A1* | 7/2025 | Kilb | G05B 19/4061 |

* cited by examiner

*Primary Examiner* — Hussein Elchanti
(74) *Attorney, Agent, or Firm* — Jeremy J. Klobucar

(57) ABSTRACT

A vehicle including an impact detection system that includes an impact detection system controller, at least one sensor configured to generate and transmit a signal indicative of a distance between the vehicle and an approaching vehicle to the impact detection system controller, at least one first vehicle system in communication with the impact detection system controller that, when activated by the impact detection system controller, is configured to either alert at least one of an occupant of the vehicle and an occupant of the approaching vehicle that an impact between the vehicle and the approaching vehicle is imminent, and at least one second vehicle system in communication with the impact detection system controller that, when activated by the impact detection system controller, is configured to mitigate effects of an impact between the vehicle and the approaching vehicle.

18 Claims, 4 Drawing Sheets

IMPACT DETECTION SYSTEM

FIELD

The present disclosure relates to a vehicle having an impact detection system.

BACKGROUND

This section provides background information related to the present disclosure which is not necessarily prior art.

Distracted driving is becoming an ever-increasing concern because when a driver is distracted the chances of the vehicle being driven by the distracted driver colliding with another vehicle or object increase dramatically. While systems have been developed and implemented in vehicles to reduce distracted driving (e.g., hand-free calling), these systems do not provide an opportunity for another vehicle that may be hit by the vehicle being operated by the distracted driver to avoid the collision, or at least attempt to mitigate the effects of a collision between the vehicles. Accordingly, there is a need for vehicles to have an impact detection system that can prevent a collision or at least reduce the effects that may result from an impact between vehicles.

SUMMARY

This section provides a general summary of the disclosure, and is not a comprehensive disclosure of its full scope or all of its features.

According to a first aspect of the present disclosure there is provided a vehicle including an impact detection system. The impact detection system includes an impact detection system controller; at least one sensor configured to generate and transmit a signal indicative of a distance between the vehicle and an approaching vehicle to the impact detection system controller; at least one first vehicle system in communication with the impact detection system controller that, when activated by the impact detection system controller, is configured to either alert at least one of an occupant of the vehicle and an occupant of the approaching vehicle that an impact between the vehicle and the approaching vehicle is imminent; and at least one second vehicle system in communication with the impact detection system controller that, when activated by the impact detection system controller, is configured to mitigate effects of an impact between the vehicle and the approaching vehicle, wherein based on the signal indicative of the distance between the vehicle and the approaching vehicle, the impact detection system controller is configured to calculate a velocity of the approaching vehicle and an amount of time before the approaching vehicle impacts the vehicle; and wherein the impact detection system controller is configured to, based on the calculated velocity of the approaching vehicle and amount of time before the approaching vehicle impacts the vehicle, determine whether to activate the at least one first vehicle system before activating the at least one second vehicle system.

According to the first aspect, the at least one first vehicle system includes an interior alert system and an exterior alert system.

According to the first aspect, the interior alert system includes at least one of an interior light and a sound-emitting device, each of the interior light and the sound-emitting device being configured to generate pulses of light and sound, respectively, to alert the occupant of the vehicle of the approaching vehicle.

According to the first aspect, the exterior alert system includes an exterior lamp that is configured to flash to alert the occupant of the approaching vehicle to avoid an impact between the vehicle and the approaching vehicle.

According to the first aspect, the at least one second vehicle system includes systems selected from the group consisting of a vehicle braking system, a seating system including at least one of a motorized headrest and a self-tensioning seatbelt, an air suspension system, a steering assist system, and a camera system.

According to the first aspect, the impact detection system controller is configured to control the vehicle braking system to at least partially disengage or pulse brakes of the vehicle to permit the vehicle to move forward at least to some extent during an impact between the vehicle and the approaching vehicle.

According to the first aspect, the impact detection system controller is configured to operate a tensioning device of the self-tensioning seatbelt in advance of the impact and operate an actuator of the motorized headrest to move the motorized headrest in a direction toward the occupant of the vehicle.

According to the first aspect, the impact detection system controller is configured to operate a plurality of pumps or compressors of the air suspension system to increase a ride height of a rear end of the vehicle and decrease a ride height of a front end of the vehicle.

According to the first aspect, the impact detection system controller is configured to activate the camera system to record the approaching vehicle.

According to the first aspect, the steering assist system includes a propulsion system and a steering system, and based on instructions received from the controller, the steering assist system is configured to put the vehicle in motion and/or steer the vehicle in a direction away from the approaching vehicle.

According to a second aspect of the present disclosure, there is provided a method for avoiding or at least mitigating the effects of an impact between a vehicle and an approaching vehicle. The method includes generating a signal indicative of a distance between a sensor of the vehicle and the approaching vehicle; determining, based on the signal indicative of the distance, a velocity of the approaching vehicle and an amount of time before the approaching vehicle will impact the vehicle; and based on the velocity of the approaching vehicle and the amount of time, determining whether to either activate at least one first vehicle system to alert at least one of an occupant of the vehicle and an occupant of the approaching vehicle that an impact between the vehicle and the approaching vehicle is imminent, or activate at least one second vehicle system that is configured to mitigate effects of an impact between the vehicle and the approaching vehicle.

According to the second aspect, the at least one first vehicle system includes an interior alert system and an exterior alert system, and when it is determined to activate the at least one first vehicle system, the method further includes activating each of the interior alert system and exterior alert system.

According to the second aspect, the interior alert system includes at least one of an interior light and a sound-emitting device, and when activated each of the interior light and the sound-emitting device are configured to generate pulses of light and sound, respectively, to alert the occupant of the vehicle of the approaching vehicle.

According to the second aspect, the exterior alert system includes an exterior lamp that when activated is configured to flash to alert the occupant of the approaching vehicle to avoid an impact between the vehicle and the approaching vehicle.

According to the second aspect, the at least one second vehicle system includes systems selected from the group consisting of a vehicle braking system, a seating system including at least one of a motorized headrest and a self-tensioning seatbelt, an air suspension system, a steering assist system, and a camera system.

According to the second aspect, when the vehicle braking system is activated, the method further includes disengaging or pulsing brakes of the vehicle to permit the vehicle to move forward at least to some extent during an impact between the vehicle and the approaching vehicle.

According to the second aspect, when the seating system is activated, the method further includes tensioning of the self-tensioning seatbelt with a tensioning device and operating an actuator of the motorized headrest to move the motorized headrest in a direction toward the occupant of the vehicle.

According to the second aspect, when the air suspension system is activated, the method further includes operating a plurality of pumps or compressors of the air suspension system to increase a ride height of a rear end of the vehicle and decrease a ride height of a front end of the vehicle.

According to the second aspect, when the camera system is activated the method further includes recording the approaching vehicle.

According to the second aspect, when the steering assist system is activated, the method further includes at least one of operating a propulsion system of the vehicle and a steering system to move and/or steer the vehicle in a direction away from the approaching vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure provides an impact detection system for a vehicle that may assist in preventing a collision between the vehicle and an approaching vehicle, or at least mitigate the effects of an accident between the vehicle and the approaching vehicle. In this regard, and with reference to FIG. 1, a first vehicle 10 having an impact detection system 12 according to the present disclosure is illustrated that is being approached by a second vehicle 14, and an impact between the first vehicle 10 and the second vehicle 14 may be imminent. When reviewing FIG. 1, it should be understood that first vehicle 10 is operating (i.e., the ignition is turned to "on"), and that the first vehicle 10 may be either stopped (i.e., not moving) or in motion.

Figure 1:
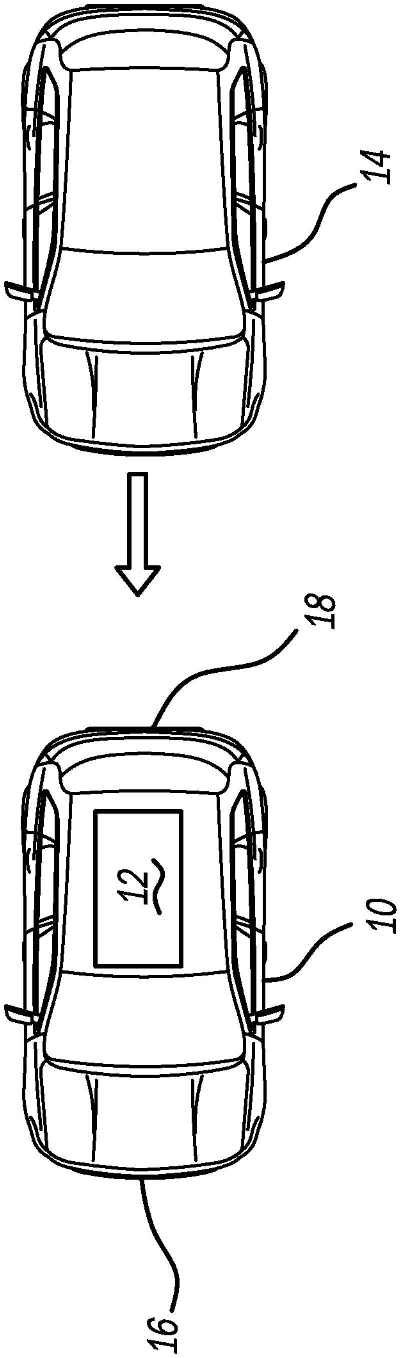
FIG. 1 is an overhead perspective view of a vehicle including an impact detection system according to a principle of the present disclosure that is being approached by another vehicle, according the present disclosure.

As shown in FIG. 1, the first vehicle 10 includes a front end 16, a rear end 18, a left side 20, and a right side 22. In one embodiment, the first vehicle 10 can use impact detection system 12 to determine whether the second vehicle 14 is approaching its rear end 18, and in response determine whether an imminent impact will occur between the approaching second vehicle 14 and the rear end 18 of the first vehicle 10.

Figure 2:
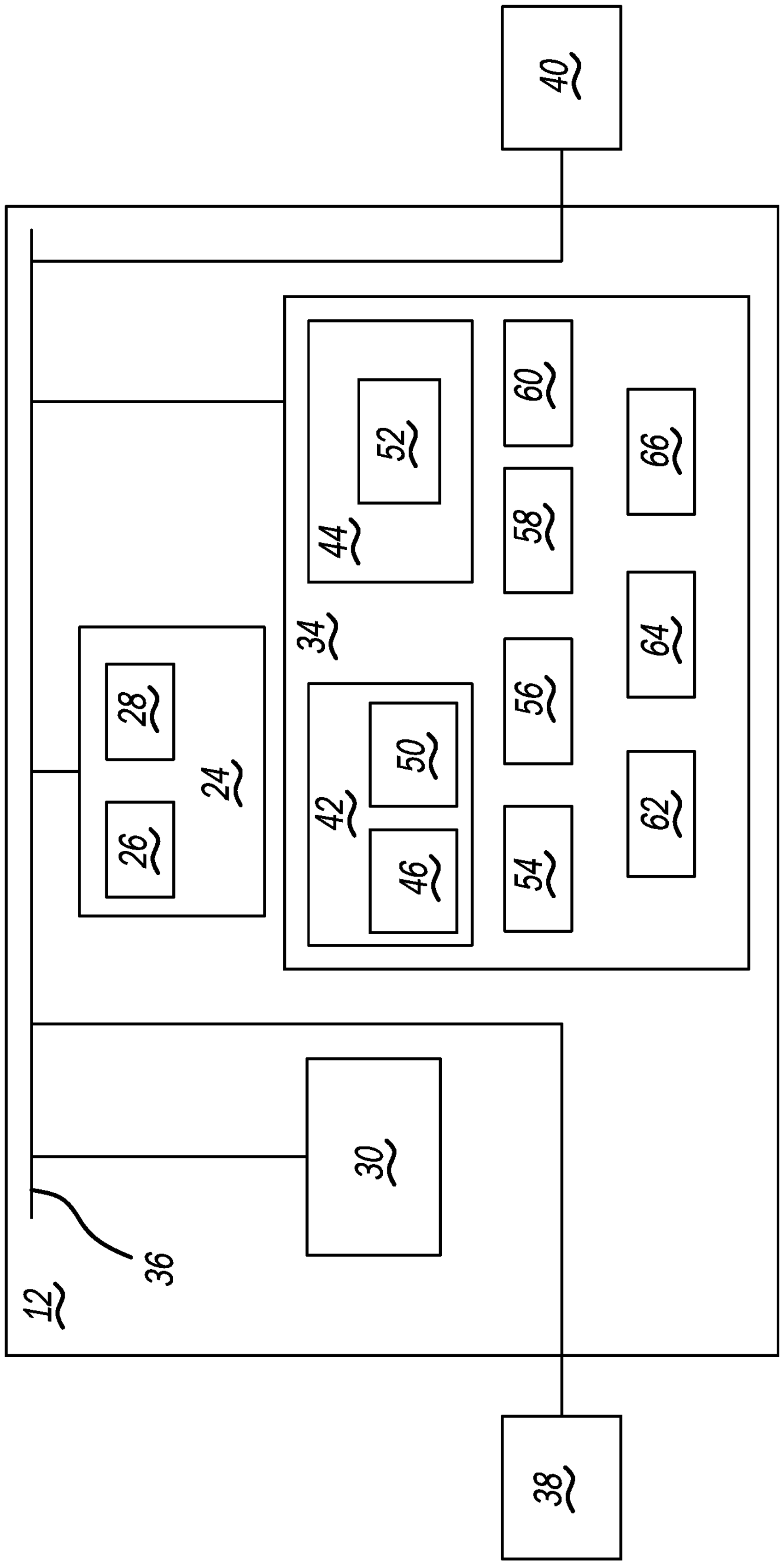
FIG. 2 is a schematic diagram of the impact detection system according to the present disclosure.

Impact detection system 12 is configured to prevent an impact between the first vehicle 10 and the second vehicle 14, or at least attempt to mitigate the effects of an impact between the first vehicle 10 and the second vehicle 14. Referring to FIG. 2, impact detection system 12 may include an impact detection system controller 24 having at least one processor 26 and at least one memory 28 that can store code and/or logic to be executed by the one or more processors 26 to perform features and functions of the impact detection system 12.

Still referring to FIG. 2, impact detection system 12 includes at least one sensor 30, impact detection system controller 24, one or more vehicle systems 34, and a communication network 36. The sensor 30 and the at least one vehicle system 34 are electrically connected and in communication with impact detection system controller 24 via the vehicle communication network 36.

The vehicle communication network 36 can include one or more networks, such as the internet, a private area network, (PAN), a local area network (LAN), a wide area network (WAN), a virtual private network (VPN), and the like. Communications via the network 36 can be performed using wired and/or wireless techniques, standards, and protocols that are known to those skilled in the art, including a controller area network (CAN) bus, WiFi, Bluetooth, cellular and/or satellite services. In addition, the impact detection system 12 may include hardware (e.g., radio, antenna, and the like) and logic to enable the above-mentioned communications.

In one example, sensor 30 may be located proximate the rear end 18 of the first vehicle 10, such as in a rear fascia. Sensor 30 may be any type of sensor known to one skilled in the art that can generate a signal indicative of a distance between the sensor 30 and the approaching second vehicle 14. A non-exhaustive list of sensors 30 that may be used to generate signals indicative of distance between sensor 30 and the approaching second vehicle 14 include ultrasonic sensors, cameras, lasers, radar sensors, combinations thereof, and the like. Regardless of the type of sensor 30 selected, it should be understood that when the signals indicative of the distance between the sensor 30 and the approaching second vehicle 14 are communicated to impact detection system controller 24, the processor 26 of the impact detection system controller 24 can determine a velocity of the approaching second vehicle 14 using the signal indicative of distance generated by sensor 30 in combination with the amount of time between each signal being received by the impact detection system controller 24. In this regard, for example, sensor 30 may communicate a signal to the impact detection system controller 24 every 0.1 seconds.

In some embodiments, the first vehicle 10 may include additional sensors connected to network 36 that can be in communication with and analyzed by the impact detection system controller 24. For example, first vehicle 10 may include sensors such as a rain sensor 38 that can be used to determine whether it is raining and a temperature sensor 40 that can be used to determine whether first vehicle 10 is operating in conditions below freezing where ice or snow may be present. Impact detection system controller 24 may utilize signals generated by each of these sensors to assist in determining the best way to prevent an impact between the first vehicle 10 and the second vehicle 14, or the best way to at least reduce the effects of an impact between first vehicle 10 and second vehicle 14, as will be described later.

While sensor 30 has been described as being positioned proximate rear end 18 of first vehicle 10, it should be understood that in some other embodiments the first vehicle 10 may include additional sensors 30 located at the front end 16 of the first vehicle 10, the left side 20 of the first vehicle 10, and the right side 22 of the first vehicle 10, which can be used to detect distances/velocities between the first vehicle 10 and any objects that may be located and/or approaching the front end 16, the left side 20, or the right side 22.

As noted above, the at least one sensor 30 is configured to generate signals indicative of a distance between the at least one sensor 30 and the approaching second vehicle 14, which can then be analyzed by controller 24 to determine a velocity of the approaching second vehicle 14. Based on the determined velocity and distance of the approaching second vehicle 14, controller 24 is configured to then determine whether an impact is imminent between the first vehicle 10 and the approaching second vehicle 14. After it is determined that an impact is imminent, controller 24 can activate one or more of the vehicle systems 34 in an attempt to prevent an impact between first vehicle 10 and the approaching second vehicle 14, or at least activate one or more of the vehicle systems 34 to mitigate the effects of an impact between first vehicle 10 and the approaching second vehicle 14.

More specifically, based on the determined distance and velocity of the approaching second vehicle 14, the processor 26 of controller 24 is configured to determine an amount of time that will elapse until the approaching vehicle 14 impacts the first vehicle 10. Once the amount of time before an impact between the first vehicle 10 and the approaching second vehicle 14 is determined, controller 24 can select which of the one or more of the vehicle systems 34 to activate to attempt to prevent an impact between first vehicle 10 and the approaching second vehicle 14 and/or mitigate the effects of an impact between first vehicle 10 and the approaching second vehicle 14.

After the controller 24 determines the amount of time that will elapse before the approaching second vehicle 14 impacts the first vehicle 10, the controller 24 is configured to determine whether there is a sufficient amount of time before impact for an occupant (e.g., driver) of the first vehicle 10 to take corrective action to avoid the impact. In some embodiments, the amount of time available for the occupant to take corrective action to avoid impact must be greater than or equal to a predetermined value, such as an impact threshold time. In other embodiments, the amount of time available for the occupant to take corrective action is based on a machine learning model or a mathematical model stored in the at least one memory 28 that can be utilized by the at least one processor 26 of the controller 24.

If controller 24 determines that the amount of time available before impact is sufficient for an occupant of the first vehicle 10 to take corrective action to avoid the impact, controller 24 is configured to activate one or more of the vehicle systems 34 to alert an occupant of the first vehicle 10 that the second vehicle 14 is approaching in a manner where an impact between the two vehicles 10 and 14 may be imminent, as well as activate one or more of the vehicle systems 34 to alert an occupant of the approaching second vehicle 14. Some vehicle systems 34 that can be used to alert either an occupant of the first vehicle 10 or an occupant of the approaching second vehicle 14 include passive systems such as, for example, an interior alert system 42 that is configured to alert an occupant of the vehicle 10 and an exterior alert system 44 that configured to alert an occupant of the approaching second vehicle 14.

Figure 3:
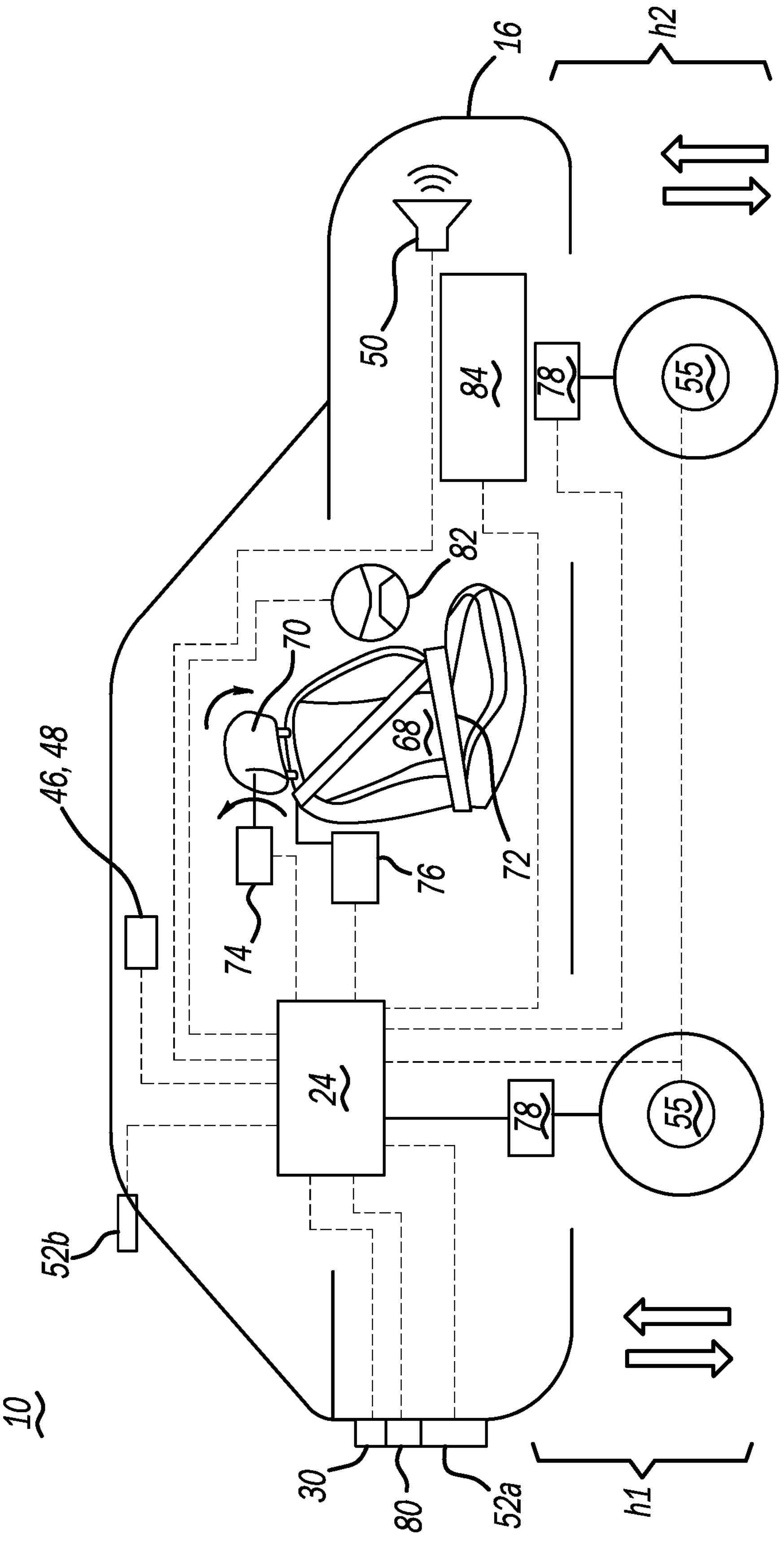
FIG. 3 is a schematic illustration of a vehicle having the impact detection system of FIG. 2 according to a principle of the present disclosure.

In one form, the interior alert system 42 may include at least one interior light 46 (FIG. 3) that is configured to illuminate an interior space of the first vehicle 10 so an occupant of the first vehicle 10 is alerted that an impact to first vehicle 10 may be imminent. The interior light 46 can include, for example, at least one of a dome light 48, a map reading lamp (not shown), dashboard lights (not shown), footwell lights (not shown), one or more door lights (not shown), and combinations thereof. In a preferred embodiment, the controller 24 is configured to flash the interior light 46 (e.g., dome light 48) such that the interior light 46 operates as a strobe to increase the chances of alerting an occupant of the first vehicle 10 that an impact may be imminent. Controller 24 may operate interior light(s) 46 until controller 24 determines that an impact has been avoided (i.e., first vehicle 10 is alerted and takes corrective action to avoid the impact, or the second approaching vehicle 14 takes corrective action to avoid the impact). Controller 24 can determine whether an impact has been avoided based on signals received from sensor 30. In the event that an impact occurs, controller 24 may be configured to maintain illumination of interior light(s) 46 to assist occupants of first vehicle 10 in exiting first vehicle 10.

Alternatively or in addition to the interior alert system 42 having an interior light 46, it should be understood that interior alert system 42 may also include a sound-emitting device 50 that configured to emit a tone or sound to alert an occupant of the first vehicle 10 that an impact may be imminent. Example sound-emitting devices 50 include a vehicle horn or a chime emitted through a vehicle speaker. Similar to interior light 46, the controller 24 may activate the sound-emitting device 50 as a prolonged pulse or as a series of pulses until an impact is avoided. If an impact is not avoided, controller 24 may be configured to cease operation of the sound-emitting device 50. While the use of sound-emitting device 50 is predominantly directed to alerting an occupant of the first vehicle 10, it should be understood that if the sound-emitting device 50 is embodied by the vehicle horn, the activation of the vehicle horn may also be effective at alerting an occupant of the approaching second vehicle 14.

The exterior alert system 44 may include at least one exterior lamp 52 such as the rear tail lamps 52*a* or brake lamp 52*b* that are illuminated and repeatedly flashed to alert an occupant of the approaching second vehicle 14 that a collision with first vehicle 10 may be imminent. Exterior alert system 44 may be operated by controller 24 in the same manner as interior light 46. That is, controller 24 may operate exterior lamp 52 until controller 24 determines that an impact has been avoided (i.e., first vehicle 10 has been alerted by interior alert system 42 and has taken corrective action to avoid the impact, or the second approaching vehicle 14 has been alerted by exterior alert system 44 and taken corrective action to avoid the impact). Controller 24 can determine whether an impact has been avoided based on signals received from sensor 30. In the event that an impact occurs, controller 24 may be configured to maintain illumination and flashing of the exterior lamp 52 to alert other vehicles that may be approaching the collision.

Before or after controller 24 activates the interior or exterior alert systems 42 and 44, controller 24 may determine that the amount of time available before impact is insufficient for an occupant of the first vehicle 10 to take corrective action to avoid the impact. That is, based on the signals received from sensor 30, controller 24 may determine that an impact is imminent between the first vehicle 10 and the approaching second vehicle 14 before activating the interior and exterior alert systems 42, 44. Alternatively, based on the signals received from sensor 30, controller 24 may determine after activating the interior and exterior alert systems 42, 44 that the alerts have not been effective and the second vehicle 14 is continuing to approach at a velocity where a collision is imminent.

In either case, once controller 24 determines that a collision is likely to occur, controller 24 is configured to activate at least one vehicle system 34 that proactively attempts to mitigate the potential effects of an impact between the first vehicle 10 and the approaching second vehicle 14. Example vehicle systems 34 that can be used to mitigate the effects of a collision between the first vehicle 10 and the second vehicle 14 include at least one of a vehicle brake system 54, a seating system 56, a suspension system 58, a camera system 60, a steering assistance system 62, an automatic calling system 64, and a power door lock system 66.

The vehicle brake system 54 includes vehicle brakes 55 that are configured, based on instructions received from controller 24 after controller 24 has determined that a collision is likely to occur between the first vehicle 10 and the second vehicle 14, to release or be pulsed in a manner where the first vehicle 10 is able to roll forward during impact. By permitting first vehicle 10 to roll forward at least to some extent, the force exerted on first vehicle 10 by second vehicle 14 may be reduced to an extent where injury to an occupant of the first and second vehicles 10 and 14 may be avoided. In addition, operation of brake system 54 may provide for better control of the first vehicle 10 by an occupant thereof during and after the collision.

Seating system 56 includes a seat 68. While only one seat 68 is shown in the drawings, it should be understood that the seating system 56 includes a plurality of seats 68. Each seat 68 may include a powered headrest 70 and a self-tensioning seatbelt 72. In one example, the powered headrest 70 is a motorized headrest having an actuator 74 configured to adjust a position of the headrest 70 to a desired position, and self-tensioning seat belt 72 may include a tensioning device 76 that can increase or decrease a tension exerted by seat belt 72 on an occupant of the seat 68. After controller 24 determines that a collision is imminent between first vehicle 10 and the approaching second vehicle 14, controller 24 is configured to communicate with tensioning device 76 to increase a tension of the seatbelt 72 in advance of the impact to reduce the chances that the occupant may be thrown in a forward direction during the impact, and instruct actuator 74 of the motorized headrest 70 to move the headrest 70 in a direction toward the occupant of the seat 68 to potentially reduce whiplash that may be experienced by an occupant of the seat 68 during impact. This process may be avoided in seats 68 that do not include an occupant, which can be determined by an occupant sensor (not shown) of the seat 68.

Suspension system 58, based on instructions received from controller 24, may be used to adjust (e.g., increase) a ride height h1 of the rear end 18 of the first vehicle 10, while also adjusting (e.g., decreasing) a ride height h2 of the front end 16 of the first vehicle 10, or vice versa. In this regard, suspension system 58 may include electric pumps or compressors 78 in communication with controller 24 that can pump air into a flexible bellows (not shown) to increase and/or decrease the ride heights h1 and h2 of the rear end 18 and/or the front end 16. By adjusting the ride heights h1 and/or h2, the forces exerted on first vehicle 10 by the second vehicle 14 can be directed in a manner that mitigates the risk of injury to an occupant of the first vehicle 10.

Camera system 80 may be provided in addition to sensor 30, and located at rear end 18 of first vehicle 10. Controller 22 may activate the camera system 80 to record the approaching second vehicle 14 before and during impact with the first vehicle 10, and images associated with the recording may be stored in the at least one memory 28 of controller 24 for access and reference later. Such a configuration may be advantageous from the aspect that there may be a dispute as to which vehicle 10 or 14 was at fault for the collision therebetween.

Figure 4:
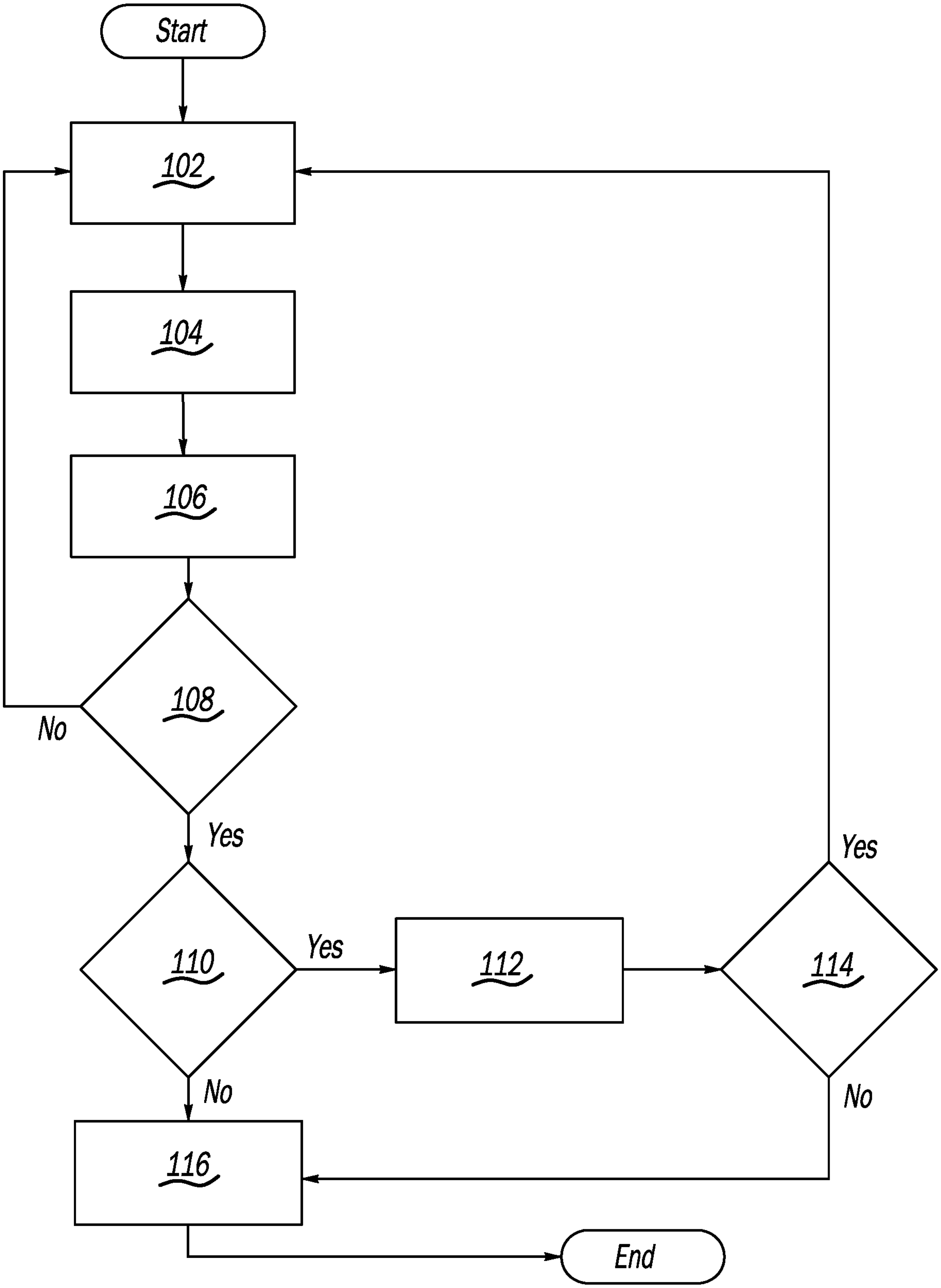
FIG. 4 is a flow chart of a method of using the impact detection system of FIG. 2 according to a principle of the present disclosure.

Still referring to FIGS. 2 and 4, steering assistance system 62 is a system that can automatically, based on instructions from controller 24, take control of a steering system 82 and propulsion system 84 of the first vehicle 10, which can be used in combination to autonomously move first vehicle 10 in order to avoid impact with the approaching second vehicle 14, or to attempt to mitigate the effects of an impact between first vehicle 10 and the second vehicle 14. For example, if controller 24 determines that an impact is imminent and corrective measures have not been taken by either the first or second vehicle 10, 14 to avoid the impact, controller 24 may instruct propulsion system to put the first vehicle 10 in motion and instruct steering system to steer the first vehicle 10 in a direction away from the approaching second vehicle 14. Such a system may be used in conjunction with any sensors 30 that are located at the front end 16, and sides 20 and 22 of the first vehicle 10. Put another way, if objects are detected at the front end 16 or one of the sides 20 and 22 of the first vehicle 10, controller 24 can instruct the steering system 82 to steer the first vehicle 10 away from these objects so as not to strike one of these objects while also attempting to avoid impact with the second vehicle 14.

Automatic calling system 64, based on an instruction received from controller 24, is configured to dial an emergency phone number to connect an occupant of the first vehicle 10 with an emergency dispatch service. That is, if controller 24 determines from signals received from sensor 30 that a collision between the first vehicle 10 and the approaching second vehicle 14 is inevitable, controller 24 may be configured to initiate a call between the first vehicle 10 and an emergency dispatch service. The emergency dispatch service may then attempt to speak with an occupant of first vehicle 10 to determine whether an emergency response is required.

Power door lock system 60 includes one or more vehicle doors (not shown) having electronic power locks (not shown) configured to lock and unlock based on instructions received from controller 24. For example, in advance of an impact, controller 24 may instruct the electronic power locks to move to a locked position. Further, if an impact has occurred and a sufficient amount of time (e.g., 5 seconds) has passed since the impact occurred, controller 24 may instruct the electronic door locks to move to an unlocked position to permit any occupants of the first vehicle 10 to exit the first vehicle 10.

Now referring to FIG. 4, an exemplary method 100 of utilizing impact detection system 12 in connection with first vehicle 10 will be described. In one embodiment, the first vehicle 10 is stopped. In an alternative embodiment, the first vehicle 10 is moving. In either case, at step 102, impact detection system controller 24 receives a signal from sensor 30 that a second vehicle 14 is approaching the first vehicle 10. Based on the signal indicative of a distance between sensor 30 and the approaching second vehicle 14, impact detection system controller 24 (i.e., processor 26) can calculate a velocity of the approaching second vehicle 14 (step 104).

After determining a velocity of the approaching second vehicle 14, impact detection system controller 24 (i.e., processor 26) will determine an amount of time that will elapse before the approaching second vehicle 14 will impact the first vehicle 12 based on signals indicative of distance generated by sensor 30 and the previously calculated velocity of the approaching second vehicle 14 (step 106). Then, based on the amount of time before an impact between first vehicle 10 and the approaching second vehicle 14, impact detection system controller 24 will determine whether a vehicle system 34 needs to be activated to avoid or at least mitigate an impact between first vehicle and the approaching second vehicle 14 (step 108). If impact detection system controller 24 determines that a vehicle system 34 does not need to be activated, the method returns to step 102. If, on other hand, impact detection system controller 24 determines that a vehicle system 34 needs to be activated, the method proceeds to step 110.

At step 110, impact detection system controller 24 decides whether to activate a passive vehicle system 34 to attempt to avoid an impact or a proactive vehicle system 34 to mitigate the effects of an impact. That is, at step 110 impact detection system controller 24 decides whether there is a sufficient amount of time to avoid the impact or whether the amount of time before impact is insufficient to avoid the impact. If the amount of time is sufficient to potentially avoid an impact, the method proceeds to step 112 where each of the interior and exterior alert systems 42 and 44 will be activated. More particularly, impact detection system controller 24 will activate interior light(s) 46 and sound-emitting device 50 to alert an occupant of the first vehicle 10 that an impact may be imminent and the occupant should take action to attempt to avoid an impact, and also activate the exterior lamp(s) 52 to potentially alert an occupant of the second vehicle 14 to potentially take corrective action to avoid the impact.

After activating the interior and exterior alert systems 42 and 44, the impact detection system controller 24 will then determine whether the alerts were effective (step 114). That is, based on the continued receipt of signals indicative of distance generated by sensor 30 that are utilized by processor 26 to calculate a velocity of the approaching second vehicle 14 and the amount of time before an impact between the vehicles 10, 14, the impact detection system controller 24 whether an impact is likely to occur. If the alerts were effective, the method may return to step 102. In contrast, if it is determined that an impact is likely to occur, the method may move to step 116 where impact detection system controller 24 will activate various proactive vehicle systems 34 to mitigate the result of an impact between the two vehicles 10, 14. In other words, impact detection system controller 24 will activate at least one of vehicle brake system 54, seating system 56, suspension system 58, camera system 60, steering assistance system 62, automatic calling system 64, and power door lock system 66 in order to put first vehicle 10 and occupants thereof in the best possible circumstances for mitigating the results of an impact between the vehicles 10, 14.

At step 110, if it is determined by impact detection system controller 24 that the amount of time before impact is insufficient to avoid the impact, a determination can be made to proceed directly to step 116 without conducting steps 112 and 114. After impact, the method ends.

It should be understood that during receipt of the signals indicative of distance generated by sensor 30, the impact detection system controller 24 is also receiving signals generated by the rain and temperature sensors 38 and 40, which may be used to determine whether environmental factors (e.g., rain, ice, snow, and the like) exist that may affect the above-described method. For example, if impact detection system controller 24 receives signals indicative of rain from rain sensor 38, the impact detection system controller 24 may determine that, even if an occupant of the second vehicle 14 is alerted before impact, that the second vehicle 14 is travelling at a velocity that would preclude the second vehicle 14 from being able to stop before the collision due to wet road conditions. In such an instance, impact detection controller 24 may determine at step 110 to proceed directly to step 116 rather than proceeding through steps 112 and 114.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle including an impact detection system, the impact detection system comprising:

an impact detection system controller;

at least one sensor configured to generate and transmit a signal indicative of a distance between the vehicle and an approaching vehicle to the impact detection system controller;

at least one first vehicle system in communication with the impact detection system controller that, when activated by the impact detection system controller, is configured to either alert at least one of an occupant of the vehicle and an occupant of the approaching vehicle that an impact between the vehicle and the approaching vehicle is imminent; and at least one second vehicle system in communication with the impact detection system controller that, when activated by the impact detection system controller, is configured to mitigate effects of an impact between the vehicle and the approaching vehicle, wherein based on the signal indicative of the distance between the vehicle and the approaching vehicle, the impact detection system controller is configured to calculate a velocity of the approaching vehicle and an amount of time before the approaching vehicle impacts the vehicle; and wherein the impact detection system controller is configured to, based on the calculated velocity of the approaching vehicle and amount of time before the approaching vehicle impacts the vehicle, determine whether to activate the at least one first vehicle system before activating the at least one second vehicle system; and wherein the at least one second vehicle system includes a vehicle braking system and the impact detection system controller is configured to control the vehicle braking system to at least partially disengage or pulse brakes of the vehicle to permit the vehicle to move forward at least to some extent during an impact between the vehicle and the approaching vehicle.

2. The vehicle according to claim 1, wherein the at least one first vehicle system includes an interior alert system and an exterior alert system.

3. The vehicle according to claim 2, wherein the interior alert system includes at least one of an interior light and a sound-emitting device, each of the interior light and the sound-emitting device being configured to generate pulses of light and sound, respectively, to alert the occupant of the vehicle of the approaching vehicle.

4. The vehicle according to claim 2, wherein the exterior alert system includes an exterior lamp that is configured to flash to alert the occupant of the approaching vehicle to avoid an impact between the vehicle and the approaching vehicle.

5. The vehicle according to claim 1, wherein the at least one second vehicle system further includes systems selected from the group consisting of a seating system including at least one of a motorized headrest and a self-tensioning seatbelt, an air suspension system, a steering assist system, and a camera system.

6. The vehicle according to claim 5, wherein the at least one second vehicle system further includes the seating system, and the impact detection system controller is configured to operate a tensioning device of the self-tensioning seatbelt in advance of the impact and operate an actuator of the motorized headrest to move the motorized headrest in a direction toward the occupant of the vehicle.

7. The vehicle according to claim 5, wherein the at least one second system further includes the air suspension system, and the impact detection system controller is configured to operate a plurality of pumps or compressors of the air suspension system to increase a ride height of a rear end of the vehicle and decrease a ride height of a front end of the vehicle.

8. The vehicle according to claim 5, wherein the at least one second system further includes the camera system, and the impact detection system controller is configured to activate the camera system to record the approaching vehicle.

9. The vehicle according to claim 5, wherein the at least one second vehicle system further includes the steering assist system, the steering assist system includes a propulsion system and a steering system, and based on instructions received from the controller, the steering assist system is configured to put the vehicle in motion and/or steer the vehicle in a direction away from the approaching vehicle.

10. A method for avoiding or at least mitigating the effects of an impact between a vehicle and an approaching vehicle, the method comprising:

generating a signal indicative of a distance between a sensor of the vehicle and the approaching vehicle;

determining, based on the signal indicative of the distance, a velocity of the approaching vehicle and an amount of time before the approaching vehicle will impact the vehicle;

based on the velocity of the approaching vehicle and the amount of time, determining whether to either activate at least one first vehicle system to alert at least one of an occupant of the vehicle and an occupant of the approaching vehicle that an impact between the vehicle and the approaching vehicle is imminent, or activate at least one second vehicle system including a vehicle braking system that is configured to mitigate effects of an impact between the vehicle and the approaching vehicle; and wherein the vehicle braking system, upon activation, mitigates effects of an impact between the vehicle and the approaching vehicle by disengaging or pulsing brakes of the vehicle to permit the vehicle to move forward at least to some extent during an impact between the vehicle and the approaching vehicle.

11. The method according to claim 10, wherein the at least one first vehicle system includes an interior alert system and an exterior alert system, and when it is determined to activate the at least one first vehicle system, the method further comprises activating each of the interior alert system and exterior alert system.

12. The method according to claim 11, wherein the interior alert system includes at least one of an interior light and a sound-emitting device, and when activated each of the interior light and the sound-emitting device are configured to generate pulses of light and sound, respectively, to alert the occupant of the vehicle of the approaching vehicle.

13. The method according to claim 11, wherein the exterior alert system includes an exterior lamp that when activated is configured to flash to alert the occupant of the approaching vehicle to avoid an impact between the vehicle and the approaching vehicle.

14. The method according to claim 10, wherein the at least one second vehicle system further includes systems selected from the group consisting of a seating system including at least one of a motorized headrest and a self-tensioning seatbelt, an air suspension system, a steering assist system, and a camera system.

15. The method according to claim 14, wherein the at least one second vehicle system further includes the seating system and when the seating system is activated, the method further comprises tensioning of the self-tensioning seatbelt with a tensioning device and operating an actuator of the motorized headrest to move the motorized headrest in a direction toward the occupant of the vehicle.

16. The method according to claim 14, wherein the at least one second vehicle system further includes the air suspension system and when the air suspension system is activated, the method further comprises operating a plurality of pumps or compressors of the air suspension system to increase a ride height of a rear end of the vehicle and decrease a ride height of a front end of the vehicle.

17. The vehicle according to claim 14, wherein the at least one second vehicle system further includes the camera system and when the camera system is activated, the method further comprises recording the approaching vehicle.

18. The method according to claim 14, wherein the at least one second vehicle system further includes the steering assist system and when the steering assist system is activated, the method further comprises at least one of operating a propulsion system of the vehicle and a steering system to move and/or steer the vehicle in a direction away from the approaching vehicle.

* * * * *